United States Patent Office 3,064,048
Patented Nov. 13, 1962

3,064,048
PROCESS FOR PREPARING 3,4',5-TRIBROMO-
SALICYLANILIDE IN THE PRESENCE OF A
WETTING AGENT
Charles H. Schramm, Easton, Pa., and Henry Lemaire,
Leonia, N.J., assignors to Lever Brothers Company,
New York, N.Y., a corporation of Maine
No Drawing. Filed July 10, 1958, Ser. No. 747,568
10 Claims. (Cl. 260—559)

The present invention relates to a process for the preparation of a novel chemical compound, 3,4',5-tribromosalicylanilide.

Polyhalosalicylanilides can be made in good yield by the direct condensation of a halogenated salicylic acid and a halogenated aniline. Although this method is satisfactory in the laboratory, it is economically undesirable commercially because of the necessity for separately halogenating the salicylic acid and the aniline portions prior to condensation. However, the halogenation of salicylanilide by methods known in the art results in comparatively poor yields.

In accordance with the invention, 3,4',5-tribromosalicylanilide is obtained in a high yield by the bromination of salicylanilide with three moles of bromine. In this bromination, it is theoretically possible to obtain a wide variety of polybrominated products, the bromine being substituted in any of several combinations of one, two and three positions in the two rings. However, in accordance with the invention the bromine entering the rings is oriented to give the 3,4',5-tribromo isomer by effecting the bromination in a medium composed of from 0.1 to 2% of an organic surfactant and from 99.9 to 98% water. The reaction mixture will contain small amounts not in excess of about 30% and usually not exceeding 20% of the 3,5 and 4',5-dibromo derivatives and the 2',3,4',5-tetrabromo derivative.

The surfactant and water when present in a concentration within the ranges stated by some unknown mechanism shift the reaction in favor of the 3,4',5-tribromo derivative. Bromination in water alone yields a product having a dark color, the reaction proceeds more slowly, and the total yield is appreciably lower, due to the formation of the tarry products imparting the dark color.

Salicylanilide is insoluble in the reaction medium at the reaction temperatures. Stirring therefore is essential throughout the reaction in order to keep the system uniform. Enough of the reaction medium should be used to ensure complete suspension of the salicylanilide, but apart from this the amount is in no way critical. The larger the volume of reaction medium, the more difficult the mix is to handle and the more dilute will be the suspension, so that the reaction will proceed more slowly. A reaction medium having a concentration of less than about 5% salicylanilide thus would not be used. At a concentration in excess of about 12%, the reaction mixture becomes quite thick and difficult to stir. Usually, a concentration of from 8% to 10% is preferred.

The reaction proceeds smoothly at a temperature within the range from about 40° to about 70° C. Preferably, from 50° to 65° C. is employed, since at the more elevated temperatures the color of the product may be dark. At temperatures below 40° C. the reaction proceeds too slowly to be practical.

It is not desirable to add all of the bromine required for the reaction to produce the tribromo product at the start of the reaction, since too high an initial bromine concentration may lead to the production of a higher proportion of brominated products containing more than three bromine atoms per molecule. Thus, the bromine can be added dropwise or in small increments over a period of from one-half to three hours. After all of the bromine has been added, the reaction mixture is held at the reaction temperature for a sufficient time to allow reaction to proceed to completion, usually in about one-half to two hours' time. The reaction mixture then can be allowed to cool to room temperature, and is filtered to remove the desired product which also is insoluble in the reaction medium.

Any organic surfactant can be employed. The anionic, cationic, and nonionic surfactants are the known classes of surfactants, and any of these, alone or in admixture, give satisfactory results. The choice of any particular surfactant will depend upon the particle size desired of the 3,4',5 - tribromosalicylanilide. Some surfactants yield quite fine particles, i.e., below 200 mesh, others quite coarse particles, i.e., above 20 mesh, and others intermediate these extremes. This phenomenon is at present unexplained.

There are many types of anionic surfactants which will at once occur to those skilled in this art. The alkyl aryl sulfonates are a class of surfactant well known in the art under this name. One example thereof are the sulfonated phenylpolypropylene alkanes, characterized by the branched chain structure of polypropylene and a tertiary alkyl carbon at the benzene ring, and having the following general structure:

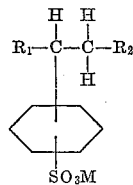

where M is hydrogen, an alkali metal or an organic amine cation, and $R_1$ and $R_2$ are alkyl, of the type formula $C_nH_{2n+1}$, and at least one R is a polypropylene group, the whole alkyl group containing preferably twelve to fifteen carbon atoms. These are known compounds, whose preparation and properties are set forth in U.S. Patent No. 2,477,383 to Lewis, issued July 26, 1949; they are available in commerce under the trade names "Oronite", "Ultrawet" and "Neolene".

Another example thereof are the alkyl aryl sulfonates made by chlorinating a keryl hydrocarbon, and condensing this with benzene, followed by sulfonating.

These give a fine particle size of 3,4',5-tribromosalicylanilide.

Also useful are the aliphatic acyl amino alkane sulfonates of the type described in Patent No. 1,932,180, the sodium alkanoyl and alkenoyl methyl taurides. They have the formula:

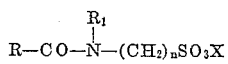

where R is an aliphatic hydrocarbon radical, such as alkyl or alkenyl, having nine to seventeen carbon atoms, $R_1$ is hydrogen or a lower alkyl radical of one to six carbon atoms such as methyl, ethyl, propyl, butyl, amyl, and hexyl, and $n$ and $X$ are the same as that defined in connection with the aminocarboxylates. Examples are lauroyl, oleoyl and stearoyl taurides, methyl taurides and amino methane sulfonates.

These give a relatively fine particle 3,4',5-tribromosalicylanilide, about 2% of which is above 200 mesh.

There can also be employed the aliphatic hydrocarbon aminocarboxylates, of the general formula:

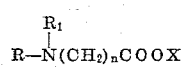

where R is an aliphatic hydrocarbon radical, such as alkyl or alkenyl, having one to eighteen carbon atoms, and $R_1$ is hydrogen or the same as R or some other aliphatic hydrocarbon radical, such as alkyl or alkenyl, having one to eighteen carbon atoms, the total number of carbon atoms of R and $R_1$ being not less than eight and not more than twenty-two, $n$ is a whole number of one to five, preferably one or two, and $x$ is a salt-forming cation, more particularly sodium, potassium, calcium, magnesium, and amine, an ethanolamine, etc. Examples of such compounds are alkyl or alkenyl aminopropionates, such as the sodium salt of dodecyl-β-alanine, octadecenyl-β-alanine, dodecyl methyl aminopropionate, diamyl aminopropionate, oleyl ethyl aminopropionate, the sodium salt of alkyl or alkenyl glycines, such as sodium dodecyl glycine, and sodium octadecenyl glycine.

These give a fairly coarse particle 3,4',5-tribromosalicylanilide, about 50% of which is above 200 mesh.

Any alkyl sulfate whose alkyl group has from about eight to about twenty-two carbon atoms is suitable, for example, lauryl, myristyl, stearyl and cetyl sulfates, and also sulfates derived from mixed fatty alcohols obtained from fatty oils, such as coconut oil fatty alcohols and palm oil fatty alcohols.

These give a relatively fine particle 3,4',5-tribromosalicylanilide.

Also useful are the sulfated ethoxynated alkyl phenols having the following general formula:

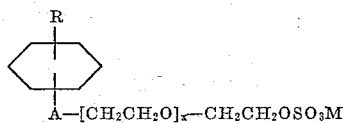

where R is a straight or branched chain saturated or unsaturated hydrocarbon group having at least eight carbon atoms up to approximately eighteen carbon atoms, A is oxygen or sulfur, $x$ is a number from three to eight, and M is hydrogen or an alkali metal, e.g., sodium, potassium, and ammonium, or an organic amine cation. The amine can be any of those listed hereinafter. R is usually a branched chain hydrocarbon group and can, for example, be a straight or branched chain octyl, nonyl, decyl, lauryl, cetyl, myristyl or stearyl group.

These give a relatively fine particle 3,4',5-tribromosalicylanilide. Exemplifying the amines are water-soluble strongly basic amines such as triethanolamine, diethanolamine, monoethanolamine, ethylenediamine, diethylenetriamine, tetraethanol ammonium hydroxide, morpholine, mixed isopropanolamines, monoisopropanol amine, diethylene glycol amine, and amino ethyl ethanolamine. The alkylolamines, either mono-, di- or tri-, are preferred.

There are many types of nonionic surfactants known to those skilled in the art, and any of these or mixtures thereof could be employed, including, for example, alkyl oxy- and thioether and oxy- and thioester surfactants having the following general formula:

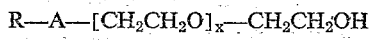

where R is a straight or branched chain saturated or unsaturated hydrocarbon group having from eight to eighteen carbon atoms or an aralkyl group having a straight or branched saturated or unsaturated hydrocarbon group of from eight to eighteen carbon atoms attached to the aryl nucleus, and attached to A through the aryl nucleus, A is selected from the group consisting of ethereal oxygen and sulfur, carboxylate and thiocarboxylate groups and $x$ is a number from eight to thirty. R can for example be a straight or branched chain octyl, nonyl, decyl, lauryl, myristyl, cetyl, or stearyl group, or an alkyl aryl group such as octylbenzene, nonylbenzene, decylbenzene, stearylbenzene, etc.

When R is alkyl it will be evident that the surfactant can be regarded as derived from an alcohol, mercaptan, oxy or thio fatty acid of high molecular weight, by condensation with ethylene oxide. Typical of this type of alkyl ether are the condensation products of oleyl or dodecyl alcohol or mercaptan with "Emulfor ON," "Nonic 218" and "Sterox SE" and "SK". Typical alkyl esters are "G1226" and "Renex" (polyoxyethylene ester of tall oil acids), "Sterox CD", "Neutronyl 330" and "331" (higher fatty acid esters of polyethylene glycol).

When R is aralkyl, the surfactant can be derived from an alkyl phenol or thiophenol.

The oxyethylated alkyl phenols and thiophenols have the following general formula:

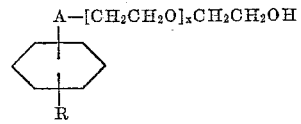

where R is a straight or branched saturated or unsaturated hylrocarbon group having at least eight carbon atoms up to approximately eighteen carbon atoms, A is oxygen or sulfur and $x$ is a number from eight to thirty. R can, for example, be a straight or branched chain octyl, nonyl, decyl, lauryl, myristyl, cetyl or stearyl. Typical are the condensation products of octyl and nonyl phenol with from eight to seventeen moles of ethylene oxide, available commercially under the trade names "Oronite NIW," "Antarox A-400," "Igepal CA" and "CO," "Triton X-100," "Neutronyx 600" and "Tergitol NPX."

Also useful are the alkyl carboxyamido condensation products (condensation products of ethanolamine with fatty carboxylic acids and fatty thiocarboxylic acids) having the following general formula:

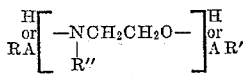

The compound has at least one RA or R'A group, usually one or two, R and R' are straight or branched chain saturated or unsaturated hydrocarbon groups having from eight to eighteen carbon atoms, R" is hydrogen, an alkyl group of one to about twenty-four carbon atoms, or a second

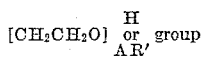

A is selected from the group consisting of carbonyl C=O and thiocarbonyl C=S groups, and $x$ is a whole number equal to the valence of RA or R'A. For example, if one of RA or R'A is a dicarboxylic acid, $x$ is at least two, with a possibility of longer chains of amido- and ester-linked acid and ethylene units. Usually $x$ is from one to four. R, R' and R" can, for example, be a straight or branched chain octyl, nonyl, decyl, lauryl, myristyl, cetyl or stearyl group.

The Pluronics are a group of nonionic surfactants having the formula:

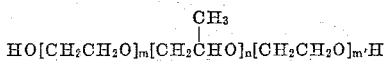

These are fully described in U.S. Patent No. 2,674,619 to L. G. Lundsted, dated April 6, 1954; see especially column 3, lines 55 to 71. See also U.S. Patent No. 2,677,700 to D. R. Jackson et al., dated May 4, 1954.

$m$ and $m'$ represent the average number of oxyethylene units, and $n$ the average number of oxypropylene units. See U.S. Patent No. 2,674,619. The sum of $m$ and $m'$ preferably is within the range from fifteen to forty-one, and $n$ preferably is within the range from seventeen to thirty-one.

These give a fine particle 3,4',5-tribromosalicylanilide.

The process of the invention as stated also can be based upon cationic surfactants. These are characterized by the fact that the hydrophobic group forms part of cation when the compound is dissolved in water. The amines and quaternary ammonium salts are the preferred groups of cationic surface active agents, but any such agents known to those skilled in the art can, of course, be used. The quaternary ammonium compounds are soluble in both basic and acidic media. The primary, secondary, and tertiary amines containing a hydrophobic group sufficiently large to be in the surface active range are less soluble in water and in alkaline solutions, and usually require solubilization with an organic solvent. They are, however, soluble in acidic solutions where the pH is low enough to convert the bases to their amine salts. In addition to these classes of materials, there are the surface active agents based upon guanidines, hydrazines, amine oxides and nitrogen-containing heterocyclic substances, as well as sulfonium compounds containing long-chain hydrophobic groups.

The quaternary ammonium compounds have at least one long aliphatic chain having from about twelve to about eighteen carbon atoms, and the remaining valences of the nitrogen are taken with short-chain aliphatic radicals usually having from one to five carbon atoms, or by hydrogen. These compounds have the general formula $R_1R_2R_3R_4NX$, wherein one R is a long-chain aliphatic radical as described, and the remaining R's are additional long-chain or short-chain aliphatic radicals, or hydrogen, and X is an anion such as halogen, for example halide or bromide, sulfate, nitrate, and the like. Typical quaternary ammonium compounds having surface active properties are palmityl trimethyl ammonium chloride, stearyl dimethyl benzyl ammonium chloride, oleyl trimethyl ammonium chloride, cetylpyridinium bromide, and coconut fatty alkyl dimethyl benzyl ammonium chloride (Roccal, Triton K60). These give a quite coarse particle 3,4',5-tribromosalicylanilide.

Another well known class of cationic detergents have the formula $RCONHC_2H_4N(C_2H_5)_2$, where R is a long-chain hydrophobic group derived from a fatty acid and has from nine to seventeen carbon atoms. These compounds are available under the trade name "Sapamines."

Typical compounds are those where R is oleyl, stearyl and palmityl.

The following examples are illustrative:

EXAMPLES 1 TO 6

Salicylanilide (213 g., one mole) was suspended in 2.5 liters of water containing 2 g. (basis active) surfactant and brought to 55° C. The surfactant was as listed in the table below. The suspension was stirred and 480 g. (three moles) of bromine was added dropwise while maintaining a temperature from 55° to 60° C. The bromine addition required ninety minutes, and the mixture was held at 55° C. for an additional hour. At the end of this time the product was cooled to room temperature, neutralized, and filtered. The filter cake was washed twice with methanol and dried. The yield in all cases was about 95–98% of material containing 70 to 79% 3,4',5-tribromosalicylanilide, from 1 to 4% 4',5-dibromosalicylanilide, from 12 to 17% 3,5-dibromosalicylanilide and from 4 to 15% 2'3,4',5-tetrabromosalicylanilide. The yields and particle sizes obtained are listed in Table I:

*Table I*

| Example No. | Surfactant | Percent Yield | | | | Percent Retained on 200 Mesh | Percent Bromine [5] |
|---|---|---|---|---|---|---|---|
| | | Percent 3,4',5 [1] | Percent 4',5 [2] | Percent 3,5 [3] | Percent 2'3,4'5 [4] | | |
| 1 | Igepon T (sodium oleyl methyl tauride) | 78 | 1 | 13 | 8 | 2.31 | 52.63 |
| 2 | Cetyltrimethylammonium bromide (Cetab) | 79 | 4 | 13 | 4 | 70.57 | 51.21 |
| 3 | Sodium salt of coco-beta-alanine (Deriphat XD-151) | 70 | 3 | 12 | 15 | 43.63 | 52.82 |
| 4 | Sodium lauryl sulfate | 74 | 2 | 12 | 12 | 2.92 | 52.23 |
| 5 | Ammonium salt of sulfated nonylphenol-4 mole ethylene oxide condensate (Alipal CO-436, NPES-4) | 74 | ---------- | 17 | 9 | 3.37 | 51.20 |
| 6 | Sodium salt of dodecylbenzenesulfonate | 75 | 5 | 14 | 6 | 0.27 | 51.53 |

[1] 3,4',5-tribromosalicylanilide.
[2] 4',5-dibromosalicylanilide.
[3] 3,5-dibromosalicylanilide.
[4] 2'3,4'5-tetrabromosalicylanilide.
[5] Analysis based on entire mixture; theoretical for 3,4',5-tribromosalicylanilide—53.29%.

EXAMPLE 7

Salicylanilide (213 g., one mole) was suspended in 2.5 liters of water containing 5 g. (40% active) of an aqueous sodium dodecylbenzenesulfonate paste. The suspension was stirred and heat was applied to bring the temperature of the mixture to 55° C. Two-thirds (320 g., two moles) of the bromine was added during this period and the remaining one-third (160 g., one mole) was added at 55–60° C. The bromine addition required ninety minutes, and the reaction temperature was held at 65° C. for an additional hour. At the end of this time, the product was cooled to room temperature and 175 cc. of an aqueous 10% sodium bisulfite solution was added. After neutralization with 130 g. (in 500 cc. of water) of sodium hydroxide to pH 4, the crude, 3,4',5-tribromosalicylanilide was filtered and dried. The yield was 440 g. (98%) of material containing 77% 3,4',5-tribromosalicylanilide, 4% 4',5-dibromosalicylanilide, 13% 3,5-dibromosalicylanilide and 6% 2',3,4',5-tetrabromosalicylanilide. The material was composed of fine particles below 200 mesh.

EXAMPLE 8

Salicylanilide (213 g., 1 mole) was suspended in 2.5 liters of water containing 2 g. Pluronic F68. The suspension was stirred and heat was applied to bring the temperature of the mixture to 55° C. Two-thirds (320 g., two moles) of the bromine was added during this period and the remaining one-third (160 g., one mole) was added at 55–60° C. The bromine addition required ninety minutes, and the reaction temperature was held at 65° C. for an additional hour. At the end of this time, the product was cooled to room temperature and 175 cc. of an aqueous 10% sodium bisulfite solution was added. After neutralization with 130 g. (in 500 cc. of water) of sodium hydroxide to pH 4, the crude 3,4',5-tribromosalicylanilide was filtered and dried. The yield was 440 g. (98%) of material containing 77% 3,4',5-tribromosalicylanilide, 3% 4',5-dibromosalicylanilide, 16% 3,5-dibromosalicylanilide and 4% 2',3,4',5-tetrabromosalicylanilide. The material was composed of gritty particles.

EXAMPLE 9

Salicylanilide (213 g., one mole) was suspended in 2.5 liters of water containing 2 g. of the condensation product of an average of 12 moles ethylene oxide with decanol. The suspension was stirred and heat was applied to bring the temperature of the mixture to 55° C. Two-thirds (320 g., two moles) of the bromine was added during this period and the remaining one-third (160 g., one mole) was added at 55–60° C. The bromine addition required ninety minutes, and the reaction temperature was held at 65° C. for an additional hour. At the end of this time, the product was cooled to room temperature and 175 cc. of an aqueous 10% sodium bisulfite solution was added. After neutralization with 130 g. (in 500 cc. of water) of sodium hydroxide to pH 4, the crude 3,4',5-tribromosalicylanilide was filtered and dried. The yield was 440 g. (98%) of material containing 80% 3,4',5 - tribromosalicylanilide, 4% 4',5 - dibromosalicylanilide,, 10% 3,5-dibromosalicylanilide and 3% 2',3,4',5-tetrabromosalicylanilide. The material was composed of fine particles below 200 mesh.

EXAMPLE 10

Salicylanilide (213 g., one mole) was suspended in 2.5 liters of water containing 2 g. of the condensation product of tridecyl alcohol with an average of 10 moles ethylene oxide. The suspension was stirred and heat was applied to bring the temperature of the mixture to 55° C. Two-thirds (320 g., two moles) of the bromine was added during this period and the remaining one-third (160 g., one mole) was added at 55–60° C. The bromine addition required ninety minutes, and the reaction temperature was held at 65° C. for an additional hour. At the end of this time, the product was cooled to room temperature and 175 cc. of an aqueous 10% sodium bisulfite solution was added. After neutralization with 130 g. (in 500 cc. of water) of sodium hydroxide to pH 4, the crude 3,4',5-tribromosalicylanilide was filtered and dried. The yield was 440 g. (98%) of material containing 77% 3,4',5 - tribromosalicylanilide, 2% 4',5 - dibromosalicylanilide, 18% 3,5-dibromosalicylanilide and 3% 2',3,4',5-tetrabromosalicylanilide. The material was composed of fine particles below 200 mesh.

3,4',5-tribromosalicylanilide is a novel compound having the structure:

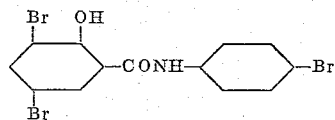

3,4',5-tribromosalicylanilide is a white compound, solid at room temperature, insoluble in water, soluble in hot acetone and very soluble in dimethylformamide. This compound has extraordinary bactericidal properties, and these properties are retained in the presence of soap.

Soap and nonsoap compositions containing 3,4',5-tribromosalicylanilide have shown excellent germicidal effectiveness when subjected to standardized tests.

The 3,4',5-tribromosalicylanilide as obtained by the process of the invention will contain small amounts of the 3,5 and 4',5-dibromosalicylanilide and the 2'3,4',5-tetrabromosalicylanilides. These also have germicidal properties, particularly the tetrabromo isomer, and there is therefore no need to free the 3,4',5-tribromosalicylanilide of these di- and tetrabromo derivatives. The mixtures of di-, tri- and tetrabromo derivatives can be used directly in soap and nonsoap compositions, and these compositions show excellent germicidal effectiveness.

The following example is illustrative:

EXAMPLE 11

Soap-synthetic chips (30 lbs.) containing 24.9% sodium tallow soap, 35% sodium coconut oil soap, 18% acyl methyl taurate prepared from 40–I.V. tallow fatty acids, 5% miscellaneous unidentified matter from the soap and taurate, 10% stearic acid, 0.02% butylated hydroxy toluene, 0.8% perfume, 0.0022% dye (FD&C Red #4), 0.3% TiO$_2$, and the balance water, were weighed into a chip mixer. All percentages shown above are expressed on the weight of the whole mixer composition. To these chips were added 0.5% (whole-composition basis) of a mixture containing 76% 3,4',5-tribromosalicylanilide, 2% 4',5-dibromosalicylanilide, 10% 3,5-dibromosalicylanilide and 12% 2'3,4',5-tetrabromosalicylanilide. The batch was mixed, milled, and plodded into bars.

8% aqueous solutions were prepared from one of these soap bars and subjected to the Finger Imprint Test. The mixture composed predominantly of the 3,4',5-tribromosalicylanilide gave a rating of 3.2. In contrast, 4',5-dibromosalicylanilide in a germicidal soap bar prepared in the same way and of the same composition gave a rating of 0.9. A bar prepared in the same way and of the same composition but containing no germicide had a rating of 0.

Only small amounts of 3,4',5-tribromosalicyanilide are required to render soap germicidal. An amount as low as 0.01% based on the weight of the soap produces a soap composition having excellent antibacterial potency. As much as 5% has been used to advantage. There is no need to employ more than is required to give the desired germicidal effect, and in general for this reason from 0.2 to 2% would be preferred. Increasing the concentration of the compound beyond 5% merely increases the cost of the soap and might tend to reduce the detergent properties of the composition. It will readily be seen that the concentration is not critical, but would be determined from a consideration of these factors as long as enough is used to give the desired antibacterial effect.

In the quantities in which the compound or mixture thereof with di- and tetrabromo salicylanilides is used in soaps, it does not produce skin irritation, is not toxic, and is compatible with the usual soap components.

The term "soap" as used herein refers to alkali metal soaps of the saturated and unsaturated higher fatty acids having from about eight to about twenty-six carbon atoms, such as capric, caprylic, lauric, myristic, palmitic, stearic, oleic, linoleic, linolenic, arachidic, behenic, margaric, tridechoic, and cerotic acids and the mixtures of such acids naturally occurring in fats, oils, waxes, and rosins, such as the soaps of coconut oil fatty acids, tallow fatty acids, pig fat, fish oil fatty acids, beeswax, palm oil fatty acids, sesame oil fatty acids, peanut oil fatty acids, olive oil fatty acids, palm kernel oil fatty acids, cottonseed oil fatty acids, soyabean oil fatty acids, corn oil fatty acids, babassu oil fatty acids, rosin acids, abietic acid, and greases.

While several mixing procedures will be apparent to those skilled in the art in order to achieve this result, the following procedure is recommended: The soap chips are weighed into the mixer and followed immediately by addition of the remaining components of the mix, for example, perfume and dye, in the form of a solution if desired, and mixing is continued for a long enough period to ensure a thorough dispersion. Thereafter the 3,4',5-tribromosalicylanilide or mixture thereof with di- and tetrabromo salicylanilides is added with complete and adequate mixing only for the time to ensure uniformity of dispersion. The final mix then can be treated in the conventional ways to produce the desired soap. To form a bar, for example, the mix can be plodded and extruded using conventional equipment.

The 3,4′,5-tribromosalicylanilide soaps in accordance with the invention can be formed as bar soaps, powdered soaps, chip soaps, flake soaps, bead soaps, bar and cake soaps and soap compositions intended for toilet, washing and disinfectant purposes in addition to their use as detergents. The compositions can be dried in any desired way; spray drying is convenient in many instances. It is desirable to hold the temperature to which the mix is subjected during conversion into its final form below the temperature at which the 3,4′,5-tribromosalicylanilide would be decomposed. Soap mixtures in accordance with the invention have been subjected to temperatures up to 215° F. for periods of up to one hour without disadvantage.

The compositions of the invention meet all of the requirements for germicidal soaps, as is evident from tests which have been carried out on them, and are indistinguishable in appearance from ordinary soaps. They can be used as ordinary detergent soaps and are especially recommended for uses in which both detergent and degerming characteristics are desired. The test results show that the compositions used routinely for a period of from one to two weeks lower the bacterial flora of the skin to a very low level. The compositions are particularly valuable for routine surgical and hospital use and generally useful in the prevention of infections arising from skin bacteria.

Those skilled in the art will perceive many variations in the compositions of the invention. For example, the 3,4′,5-tribromosalicylanilide or mixture thereof with di- and tetrabromo salicylanilides need not be the only germicidal agent; other germicides, such as 2,2′-dihydroxy halogenated diphenyl methanes, can be included, if desired.

The soap compositions, in addition to the soap and germicide, will also usually contain fillers, coloring materials and perfumes, as desired, as is familiar to those skilled in the art.

The compositions containing the 3,4′,5-tribromosalicylanilide or mixture thereof with di- and tetra-bromo salicylanilides may contain mixtures of detergents, such as soap and anionic nonsoap, or soap and a nonionic nonsoap. Typical satisfactory anionic nonsoaps are the alkyl sulfates, typified by sodium lauryl sulfate, known in the trade as Duponol C, the alkyl aryl sulfonates, typified by the sodium polypropylene benzene or toluene sulfonates, and the sodium keryl benzene or toluene sulfonates, the sulfated ethoxynated phenols, typified by the ammonium salt of sulfated ethoxynated nonyl phenol, prepared by condensation of nonyl phenol with five moles of ethylene oxide, and the sodium fatty acid esters of taurine, typified by sodium palmitic or oleic methyl tauride or mixtures thereof, and the esters of higher fatty acids and hydroxy ethane sulfonates such as oleic acid ester of hydroxy ethane sodium sulfonate. Also useful are nonionic nonsoaps, such as the polyethylene glycol esters of the higher fatty acids, typified by polyoxylene ethylene and propylene glycol stearates, the polyethylene glycol ethers of alkyl phenols, typified by the condensation product of octyl and nonyl phenol with five to twelve moles of ethylene oxide, and the higher fatty acid esters of sorbitanethylene oxide condensates, such as sorbitan monostearate ester of polyoxyethylene glycol. They may be in any of the forms described heretofore, including cakes or powders, and may include various fillers, sudsing agents and ingredients conventionally employed in detergent formulations. They may be compounded for various purposes, such as for shampoo, dishwashing, textile laundering, toilet soaps and similar preparations.

The 3,4′,5-tribromosalicylanilide or mixture thereof with di- and tetrabromo salicylanilides may be included in compositions which contain soap or other surface active agents not intended primarily for detergent use, such as various powdered cosmetics.

This application is a continuation-in-part of application Serial No. 700,732, filed December 5, 1957, and now abandoned.

We claim:
1. A process for preparing a mixture of brominated derivatives composed predominantly of 3,4′,5-tribromosalicylanilide which comprises brominating one mole of salicylanilide with three moles of bromine in a reaction medium consisting essentially of from 99.9 to 98% water and from 0.1 to 2% of an organic surfactant.
2. A process in accordance with claim 1, the bromine being added dropwise.
3. A process in accordance with claim 1, in which the surfactant is anionic.
4. A process in accordance with claim 3, in which the surfactant is an alkylaryl sulfonate.
5. A process in accordance with claim 3, in which the surfactant is an aliphatic hydrocarbon acyl amino alkane sulfonate.
6. A process in accordance with claim 3, in which the surfactant is an alkyl sulfate.
7. A process in accordance with claim 1, in which the surfactant is cationic.
8. A process in accordance with claim 7, in which the surfactant is a quaternary hydrocarbon substituted ammonium compound.
9. A process in accordance with claim 1, in which the surfactant is nonionic.
10. A process in accordance with claim 9, in which the surfactant is an alkyl oxyethylene condensation product.

References Cited in the file of this patent
UNITED STATES PATENTS

| | | |
|---|---|---|
| 2,511,784 | O'Neal | June 13, 1950 |
| 2,675,409 | Orloff et al. | Apr. 13, 1954 |
| 2,802,029 | Schuler | Aug. 6, 1957 |

FOREIGN PATENTS

| | | |
|---|---|---|
| 180,961 | Austria | Nov. 19, 1954 |
| 516,037 | Belgium | Dec. 31, 1952 |
| 937,646 | Germany | June 12, 1956 |

OTHER REFERENCES

Hirwe et al.: Proc. Ind. Acad. Sci., vol. 5A, pages 321–325 (1937).

Hirwe et al.: J. Indian Chem. Soc., vol. 16, pages 281–284 (1939).

Judhev et al.; J. University of Bombay, vol. 20, Sec. A, pt. 3, pages 97–100 (1951).